June 14, 1927.
R. H. MULLINEAUX
1,632,496
INTERLINER FOR PNEUMATIC TIRES
Original Filed Nov. 2, 1921
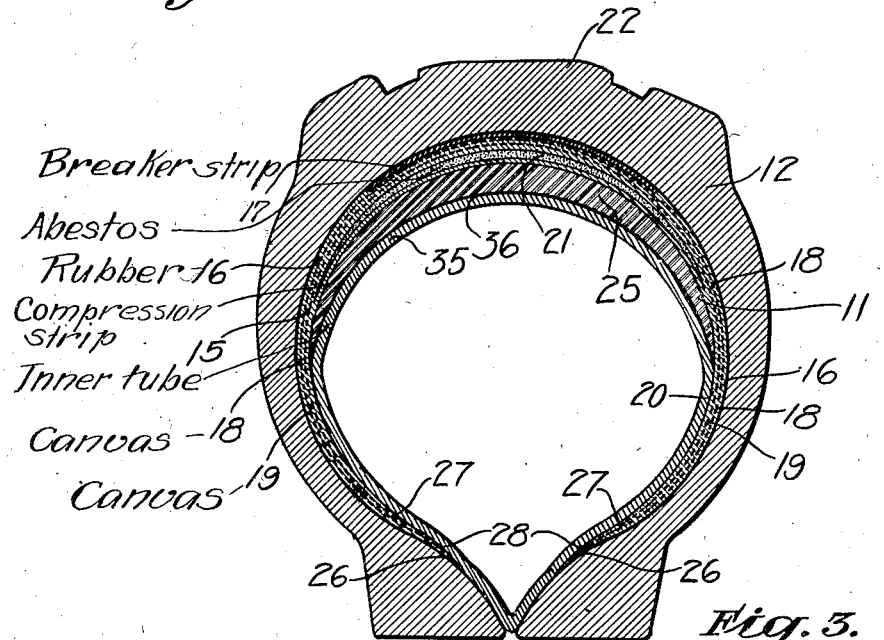
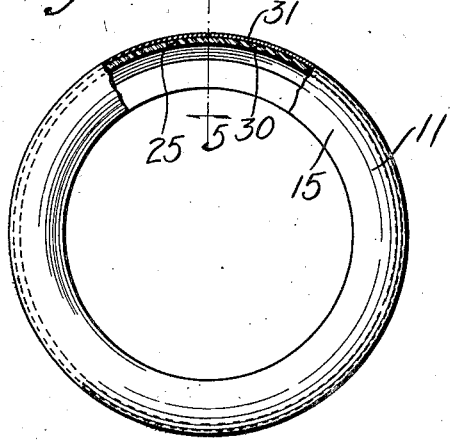
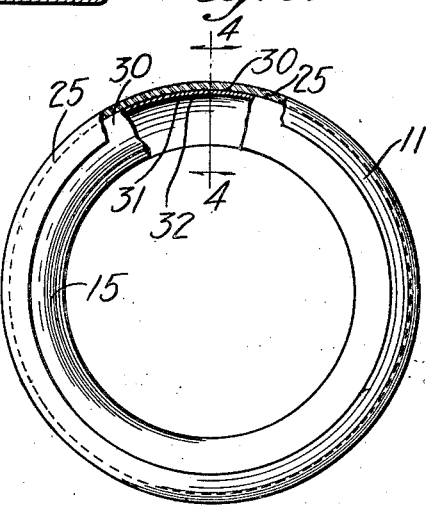
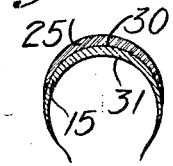
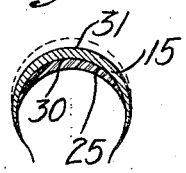
INVENTOR:
RICHARD H. MULLINEAUX,
BY Graham Harris
ATTORNEYS.

Patented June 14, 1927.

1,632,496

UNITED STATES PATENT OFFICE.

RICHARD H. MULLINEAUX, OF LOS ANGELES, CALIFORNIA.

INTERLINER FOR PNEUMATIC TIRES.

Application filed November 2, 1921, Serial No. 512,270. Renewed February 4, 1924.

This invention relates to the manufacture of auxiliary casing interliners which are placed within the pneumatic casings for the reinforcement thereof so that the life of the casing may be prolonged to an extent considerably beyond that which is obtained without the use of such reinforcement.

It is an object of my invention to provide an interliner which will increase the useful life of a tire and which will prevent leakage of air from the tire due to the puncture of the tube through the tread of the casing.

It is also an object of my invention to provide an interliner which will have a body or strip of compressed rubber disposed circumferentially around the interior thereof, this compression strip being only partially vulcanized so that a bond will be formed between an inner tube inflated within the casing and the compression strip.

It is a further object of my invention to provide an interliner which will prevent the passage of exteriorly created heat therethrough into the inner tube thus keeping the working temperature of the tire at a reasonably low point, thus making it possible to obtain greater wear.

It is a further object of my invention to provide an interliner which will effectively block off any hole that may be made therethrough and thereby prevent sand and gravel from entering the inside of the interliner through such a hole, Other objects and advantages will be made evident hereinafter from the following specification and drawing.

Referring to the drawing, which is for illustrative purposes only,

Fig. 1 is a sectional view showing an interliner embodying my invention operatively disposed within a somewhat worn casing.

Fig. 2 is a view showing the interliner before being placed within the pneumatic casing, a portion thereof being cut away to better illustrate the invention.

Fig. 3 is a view showing the liner element of the interliner reversely flexed and the compression strip being placed upon the outwardly disposed surface thereof.

Fig. 4 is a section taken on the plane represented by the line 4—4 of Fig. 3.

Fig. 5 is a section taken on a plane represented by the line 5—5 of Fig. 2.

As shown in the drawing, I embody in my invention an interliner 11 which may be placed within a casing 12, as shown in Fig. 1. This interliner 11 consists essentially of a reinforcing liner 15 consisting of: an outer layer of rubber 16 into which is set a breaker strip 17; an outer layer of canvas fabric 18; an inner layer of canvas fabric 19; and an inner layer of rubber 20 which encloses a layer of asbestos 21 located in a position underneath the tread 22 of the casing 12. Within the liner 15, I mount a compression strip 25 having a particular utility which will be taken into consideration later in the specification. The outer canvas layer 18 extends to points 26, as indicated in Fig. 1, and constitutes the edges of the liner 15, while the inner layer of canvas 19 is stopped off at points 27 slightly above the ends 26 of the fabric 18 so that the edges of the casing may be suitably tapered off as indicated at 28. The employment of the asbestos strip 20 makes it possible to use, with my invention, inner tubes of the lower grades, as the asbestos layer prevents the passage of externally created frictional heat into the interior of the interliner, thus maintaining the inner tube at a comparatively low temperature under working conditions.

In Fig. 2 of the drawing I show the subcasing 11 in a condition previous to being placed within the casing 12, as illustrated in Fig. 1. The compression strip 25 is mounted circumferentially around the interior of the liner element 15 of the interliner and a condition of lateral compression is created therein by the particular method I employ of securing the compression strip to the liner 15. Although I utilize a special form of liner in the practice of my invention, it is possible (although not equally advantageous) to combine the compression strip with any of the standard liners now obtainable. From the natural working position shown in Fig. 2, the liner 15 is reversely flexed, or turned inside out, so that the normally inner circumferential surface 30, to which the compression strip is secured, is outwardly disposed as shown in Fig. 3, the outer surface 31 of the liner then being inwardly turned as indicated at 32. With the liner 15 in this reversely flexed condition, the compression strip is mounted thereupon, the compression strip being of a width to extend down upon the sides of the liner, as indicated in Fig. 4. One of the essential features of the compression strip is that it is composed of partially vulcanized rubber. After the compression strip 25 is properly cemented upon the surface 30, the liner 15 is flexed back to the position shown in Fig. 2 and further shown in the section, Fig. 5. It will be seen from an inspection of Figs. 4 and 5 that when the liner 15 is returned to its normal working position, the length of the arc of curvature of the cross-section of the compression strip is greatly reduced, and it will be further perceived that the circumference of the circle which the compression strip assumes when the liner is returned to its normal position is considerably less than the circumference of the circle it assumed before the return of the liner to its normal working position. This shortening effect upon the compression strip creates therein what I term a condition of lateral compression, inasmuch as the rubber is forced inwardly due to the shortening of the circumference of the compression strip and the decrease in the length of the cross-sectional arc in which the compression strip is maintained.

When the interliner is in use within a tire the inner tube 35 is forced against the inner surface 36 of the compression strip as shown in Fig. 1. This compression strip, being only partially vulcanized, presents an adhesive surface to which the tube adheres and prevents any frictional action between the inner surface 36 and the tube 35, it being known that such frictional engagement produces considerable heat and causes the rapid deterioration of the inner tube. Under operating conditions, a certain amount of heat is generated within the rubber and the fabric of the liner member 15 of the interliner 11 due to the continual flexing of the casing 12 and those parts situated therewithin as the tread 22 travels over the road surface. This heat, although not excessive, causes the vulcanization of the compression strip to the inner tube 35 which presses thereagainst, and a perfect bond is formed between the inner tube and the compression strip. It will be seen that any possibility of friction between the compression strip and the inner tube 35 is now entirely prevented, and the presence of the asbestos strip 20 preventing the inward passage of externally created heat, maintains the interior of the tire at a safe working temperature, thus considerably increasing the active life of the inner tube used therein, making it possible to use a lower quality tube, as hereinbefore mentioned.

A further feature of the compression strip is that it prevents leakage of air from the inner tube due to a puncture through the tread 22 of the casing. A nail or other shaped pointed object, upon being forced through the tread 22 and the portion of the liner 15 lying adjacent thereto and through the compression strip 25 and its coacting inner tube 35, is compressively acted upon by the compression strip 20 due to the condition of lateral compression existing therein, as previously pointed out, and a perfect seal is formed around the penetrating object, preventing the escape of air. When the penetrating object has been removed the lateral compression causes the closing of the opening, thus sealing against the passage of air from the inner tube.

The use of my invention makes it possible to greatly increase the wearing life of casings which are now ordinarily thrown away, the casings being considered not of sufficient strength to withstand the internal air pressure and the severe treatment to which tires are subjected when in use.

I claim as my invention:

In an interliner for pneumatic tires, the combination of: a liner element adapted to fit within a casing, and a body of partially vulcanized rubber extending circumferentially within said liner, said body of rubber being in a condition of lateral compression.

In testimony whereof, I have hereunto set my hand at Los Angeles, California, this 27 day of October, 1921.

RICHARD H. MULLINEAUX.